US009582240B2

(12) United States Patent
Spracklen et al.

(10) Patent No.: US 9,582,240 B2
(45) Date of Patent: Feb. 28, 2017

(54) USING CONTEXTUAL AND SPATIAL AWARENESS TO IMPROVE REMOTE DESKTOP IMAGING FIDELITY

(71) Applicant: VMware, Inc., Palo Alto, CA (US)

(72) Inventors: Lawrence Spracklen, Boulder Creek, CA (US); Banit Agrawal, Sunnyvale, CA (US); Rishi Bidarkar, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 1068 days.

(21) Appl. No.: 13/726,751

(22) Filed: Dec. 26, 2012

(65) Prior Publication Data

US 2014/0181682 A1    Jun. 26, 2014

(51) Int. Cl.
*G06K 9/00* (2006.01)
*G06F 3/14* (2006.01)
*G06F 9/44* (2006.01)

(52) U.S. Cl.
CPC .......... *G06F 3/1454* (2013.01); *G06F 9/4445* (2013.01)

(58) Field of Classification Search
None
See application file for complete search history.

(56) References Cited

U.S. PATENT DOCUMENTS

| 8,189,661 | B2 * | 5/2012 | Abdo | G06K 9/00456 375/240.02 |
| 8,582,886 | B2 * | 11/2013 | Abdo | G06K 9/348 382/176 |
| 8,600,155 | B2 * | 12/2013 | Fagg | G06K 9/36 382/165 |
| 8,737,724 | B2 * | 5/2014 | Abdo | G06K 9/00456 382/159 |
| 8,856,385 | B1 * | 10/2014 | Chen | H04L 67/10 709/220 |
| 2008/0059648 | A1 * | 3/2008 | Manges | H04N 21/234318 709/231 |
| 2010/0306413 | A1 * | 12/2010 | Kamay | H04N 19/503 709/247 |

(Continued)

OTHER PUBLICATIONS

Huifeng Shen, Yan Lu, Feng Wu, Shipeng Li, A high-performanance remote computing platform, Proceedings of the 2009 IEEE International Conference on Pervasive Computing and Communications, p. 1-6, Mar. 9-13, 2009 [doi>10.1109/PERCOM.2009.4912855].*

*Primary Examiner* — Andrae S Allison
(74) *Attorney, Agent, or Firm* — Patterson & Sheridan LLP

(57) ABSTRACT

Image data representing a desktop image for a client device that is accessing the desktop remotely is compressed according to a method that preserves image fidelity in selected non-text regions. The method, which is carried out in a remote server, includes the steps of generating image data for the remote desktop image and analyzing different regions of the remote desktop image, identifying those regions of the remote desktop image that are text regions, selecting non-text regions of the remote desktop image for lossless compression based on a spatial relationship between the non-text regions and the text regions, compressing the image data using a lossless compression protocol for a portion of the image data corresponding to the selected non-text regions, and transmitting the compressed image data to the client device.

20 Claims, 6 Drawing Sheets

(56) References Cited

U.S. PATENT DOCUMENTS

2012/0314938 A1* 12/2012 Abdo ................. G06K 9/00456
382/159
2014/0122566 A1* 5/2014 Spracklen ........... H04L 43/0829
709/203

* cited by examiner

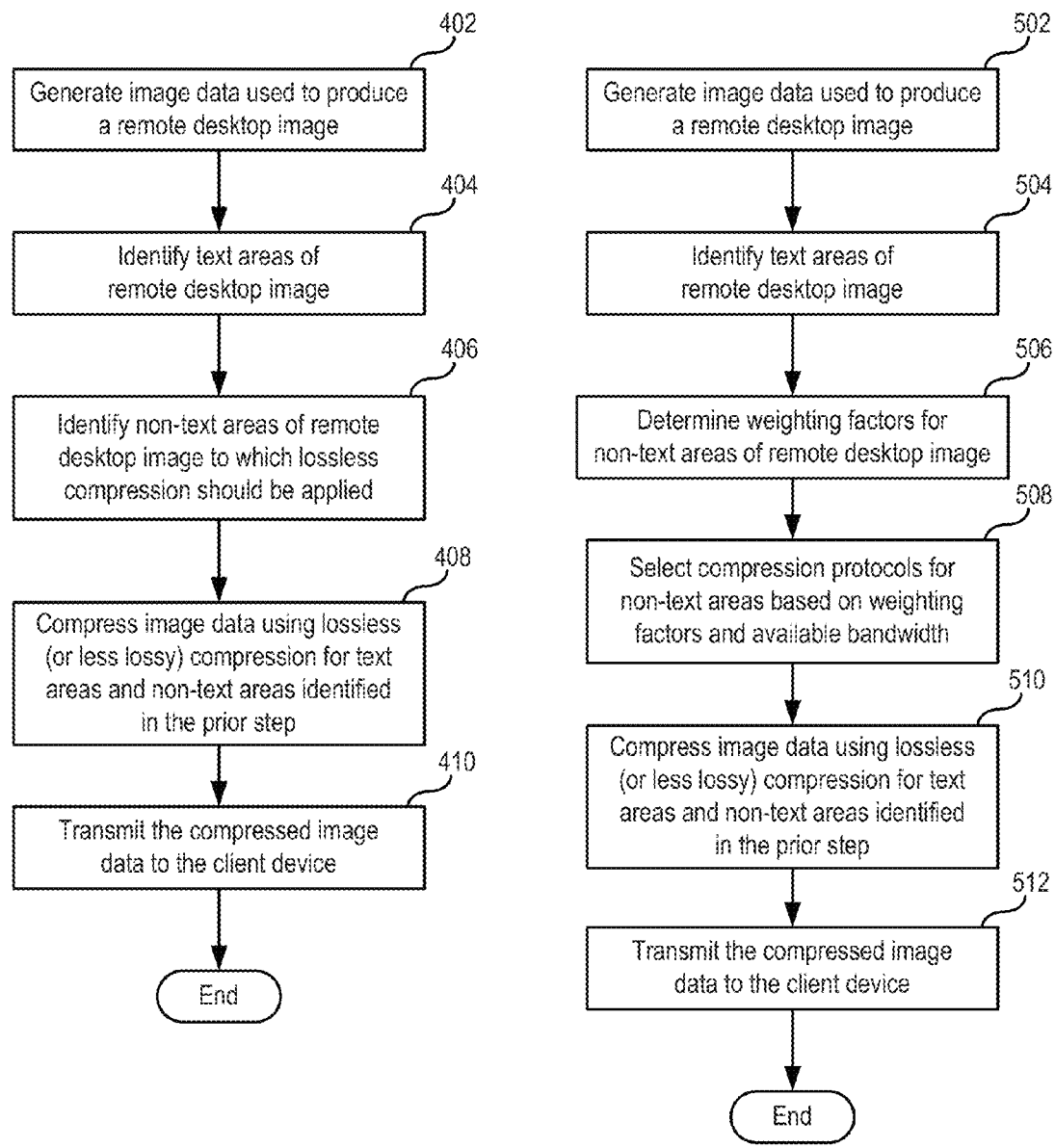

USING CONTEXTUAL AND SPATIAL AWARENESS TO IMPROVE REMOTE DESKTOP IMAGING FIDELITY

BACKGROUND

Server-based computing allows a networked client device, remotely situated with respect to a server, to access computing resources on the server. For example, the client device may run desktop client software that uses a remote desktop protocol (referred to herein as "remoting protocol"), such as Remote Desktop Protocol (RDP), Virtual Network Computing (VNC), or Personal Computer over Internet Protocol (PCoIP), to access his or her desktop running on a remote server. The client device transmits user inputs, such as keyboard or mouse inputs, to the remote server to be processed there. Then, the desktop client software receives an image of a graphical user interface (GUI) (in the form of image data) from the remote server. The GUI and the image data received by the desktop client software are generated by the operating system and applications running in the remote server, in some instances within a virtual machine that is executing on the remote server, that are continually processing the user inputs as they are received from the client device.

Remoting protocols often use compression to reduce the amount of image data that are transferred to the client device. Compression can be divided into two basic types—lossless compression and lossy compression. Lossless compression allows the image to be reproduced on the client device with full fidelity. Lossy compression reduces the amount of image data transferred to the client device, thus using less bandwidth, but this comes at a cost—lower quality in the image reconstructed at the client device.

For certain image types, such as text and simple geometric shapes, even modest levels of lossy compression can introduce image artifacts and significantly degrade a user's experience. Thus, many remoting protocols use lossless compression to handle these image types. Consequently, some remoting protocols perform a lightweight analysis of different areas of a desktop image in order to determine which compression algorithm to apply to each area. However, due to the nature of the low-cost techniques used by remoting protocols to select compression algorithms, sub-optimal compression algorithms may be selected for certain image areas. Sub-optimal and inappropriate compression can cause image degradation that becomes visually apparent to the user.

SUMMARY

One or more embodiments disclosed herein provide a method of generating compressed data representing a desktop image for a client device that is remotely accessing the desktop. The method is carried out in a remote server that is running the desktop and includes the steps of generating image data for the desktop image and analyzing different regions of the desktop image, identifying those areas of the desktop image that are text regions, selecting non-text regions of the desktop image for lossless compression (or less lossy compression relative to lossy compression to be applied to non-text regions that are not selected) based on a spatial relationship between the non-text regions and the text regions, compressing the image data using a lossless or less lossy compression protocol for a portion of the image data corresponding to the selected non-text regions, and transmitting the compressed image data to the client device.

In another embodiment, the method carried out in the remote server includes the steps of generating image data for the desktop image and analyzing different regions of the desktop image, identifying those regions of the desktop image that are text regions, determining weighting factors for non-text regions of the desktop image based on a proximity to a feature in the desktop image, selecting non-text regions of the desktop image for lossless or less lossy compression based on the weighting factors, compressing the image data using a lossless or less lossy compression protocol for a portion of the image data corresponding to the selected non-text regions, and transmitting the compressed image data to the client device. According to this method, non-text regions that are closer to the feature are given higher weighting factors than non-text regions that are farther away, and non-text regions with higher weighting factors are selected for lossless compression prior to non-text regions with lower weighting factors. Feature examples include top of the desktop image, an area encompassing the text regions, and a current location of a mouse cursor.

Further embodiments of the present invention include a computer system configured to carry out one or more of the above methods, or a non-transitory computer-readable storage medium comprising instructions that cause the computer system to carry out one or more of the above methods.

BRIEF DESCRIPTION OF THE DRAWINGS

FIG. 4 is a flow diagram of method steps for generating compressed desktop image for a client device, according to an embodiment.

FIG. 5 is a flow diagram of method steps for generating compressed desktop image for a client device, according to another embodiment.

DETAILED DESCRIPTION

Figure 1:
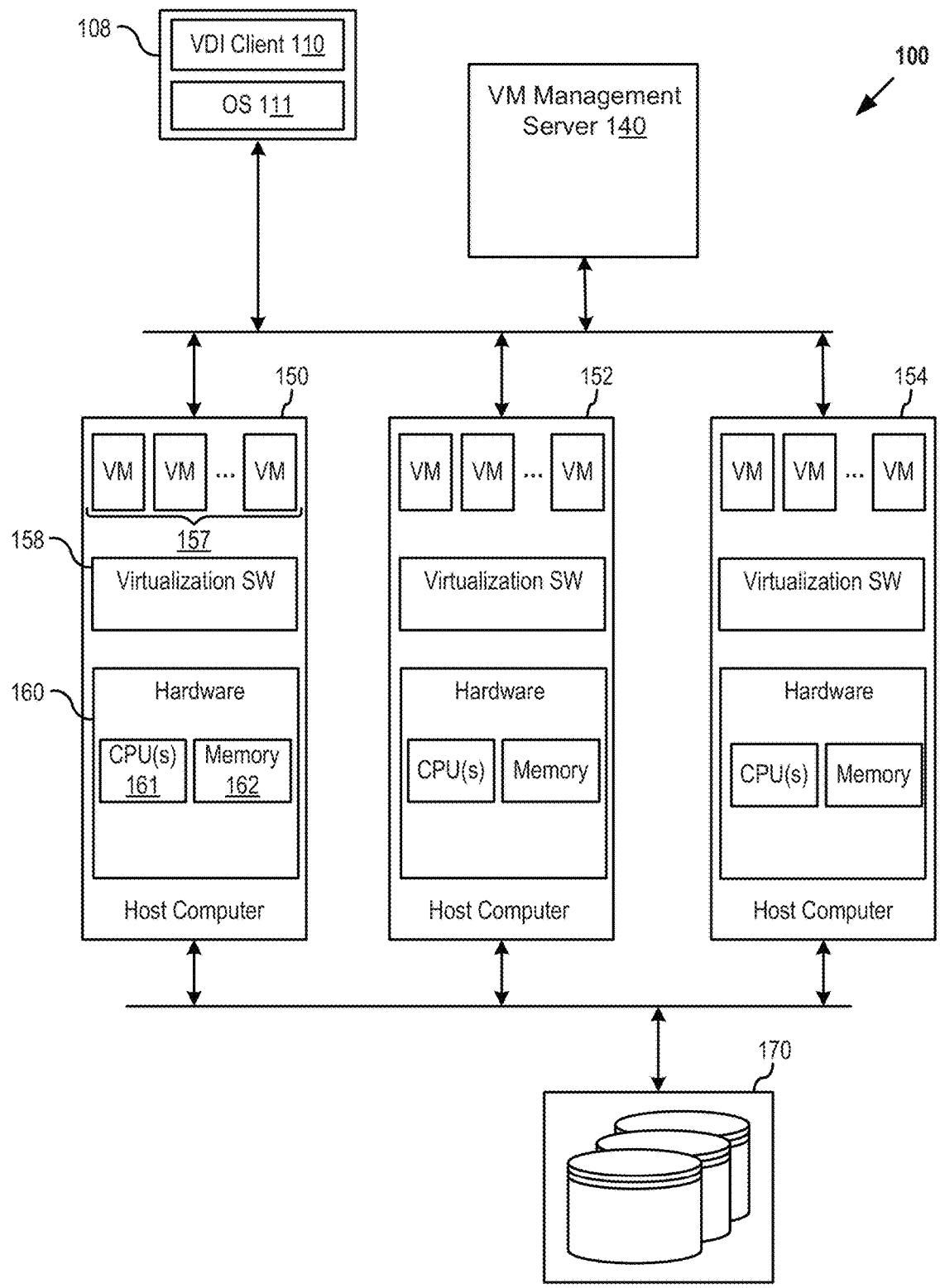
FIG. 1 depicts a simplified block diagram of a virtualized computer system in which one or more embodiments may be implemented.

FIG. 1 depicts a simplified block diagram of a virtualized computer system in which one or more embodiments may be implemented. In FIG. 1, the virtualized computer system depicted is a virtualized desktop infrastructure (VDI) system 100. Although the example provided herein is a virtualized desktop system, it should be recognized that embodiments may be practiced in other types of virtualized computer systems.

In VDI system 100, users are running VDI client software programs (herein referred to as "VDI client 110" individually and "VDI clients 110" collectively) on a local computing device 108. VDI client 110 provides an interface for a user to access his or her desktop, which may be running in one of virtual machines (VMs) 157 or blade server (not shown) in a data center that is remote from the user's location. The term, "desktop" refers to the instance of an interactive operating environment provided by a computer operating system and software applications, typically in the form of a display and sound output and keyboard and mouse input. With VDI clients 110, users can access desktops running in a remote data center through a network (e.g., Internet) from any location, using a general purpose computer running a commodity operating system (OS) 111 and a VDI client software program, such as VMware View™, or a special purpose thin client such as those available from Dell, HP, NEC, Sun Microsystems, Wyse, and others.

In the embodiments described herein, desktops are running in virtual machines 157 and virtual machines 157 are instantiated on a group of host computers commonly referred to as a cluster (depicted in FIG. 1 as host computers 150, 152, 154). Each of the host computers includes virtualization software 158 and hardware 160, including one or more CPUs 161 and system memory 162, and is coupled to a shared storage device 170. A virtual machine management server 140 controls provisioning of VMs, powering of VMs on and off, and resource management of the VMs, in the host computers.

When a user desires to connect to a remote desktop through VDI client 110, the user launches VDI client 110 on local computing device 108 and logs in by providing user credentials. VDI client 110 then communicates with a connection broker (not shown) to authenticate the user. If the authentication is successful, VDI client 110 connects directly to a virtual machine that is configured by VM management server 140 to run an instance of the user's desktop.

Figure 2:
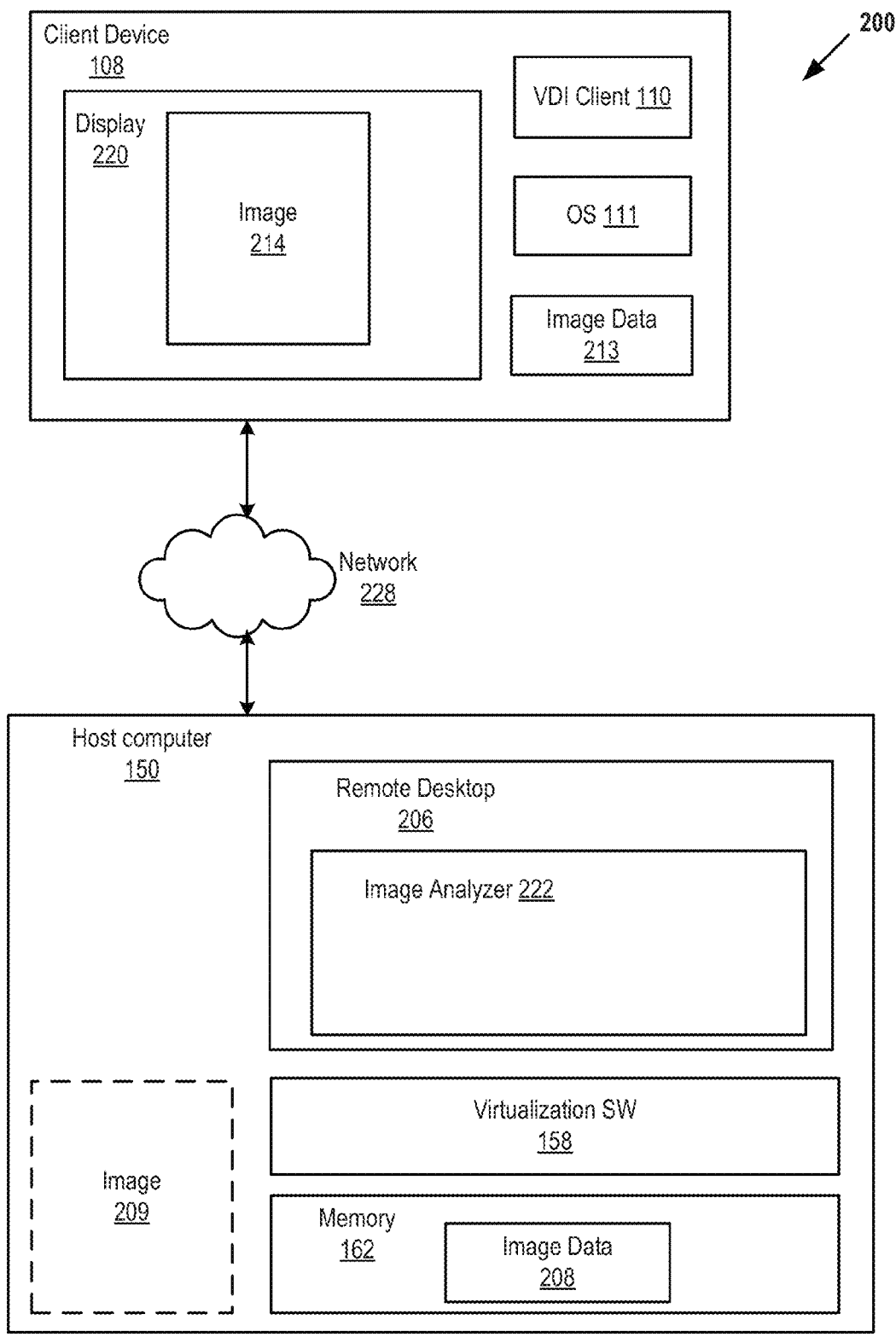
FIG. 2 is a block diagram of components of the virtualized computer system of FIG. 1 that are configured to carry out a remoting session according to an embodiment.

FIG. 2 is a block diagram of components of the virtualized computer system of FIG. 1 that are configured to carry out a remoting session according to an embodiment. In this embodiment, a user accesses his or her remote desktop 206 running in VM 157 that has been instantiated on host computer 150, using client device 108. An image 209 of remote desktop 206 is stored in memory 162 as image data 208, and image data 208 is transmitted to client device 108 for display at client device 108. Image 209 is shown within a dashed box because it is not actually displayed at host computer 150.

As also shown in FIG. 2, client device 108 has running therein VDI client 110 and OS 111, and includes a display 220. VDI client 110 receives image data 208 from host computer 150, stores a copy of image data 208 in client device 108 as image data 213, and generates an image 214 on display 220 from image data 213. As client device 108 is displaying image 214, it may also be receiving keyboard, mouse, and in some embodiments, touch-based inputs, from the user. Client device 108 transmits these inputs to host computer 150 to be processed therein.

Image analyzer 222 is executed as part remote desktop 206 in host computer 150 to analyze image data 208 and select compression protocols for portions of image data 208 corresponding to different regions of image 209. As an initial step, image analyzer 222 analyzes image 209 to determine whether any of the image regions are text regions according to techniques known in the art. Image analyzer 222 also makes certain assumptions about other regions of image 209 based on (1) contextual information it has about the applications associated with each image region, and (2) their spatial relationship with respect to the text regions. After having analyzed all of the image regions in this manner, image analyzer 222 selects the compression protocols for the portions of image data 208 corresponding to the different regions of image 209.

FIGS. 3A-3E each schematically illustrate the results of image analysis carried out by image analyzer 222. In each of FIGS. 3A-3E, image 209 is shown with gridlines to show how different regions of image 209 (each such region encompassing a plurality of pixels) analyzed by image analyzer 222, are divided into rows and columns. In the description provided below, each region of image 209 will be referenced by its respective row number and column number, e.g., (row #,column #).

Figure 3A:
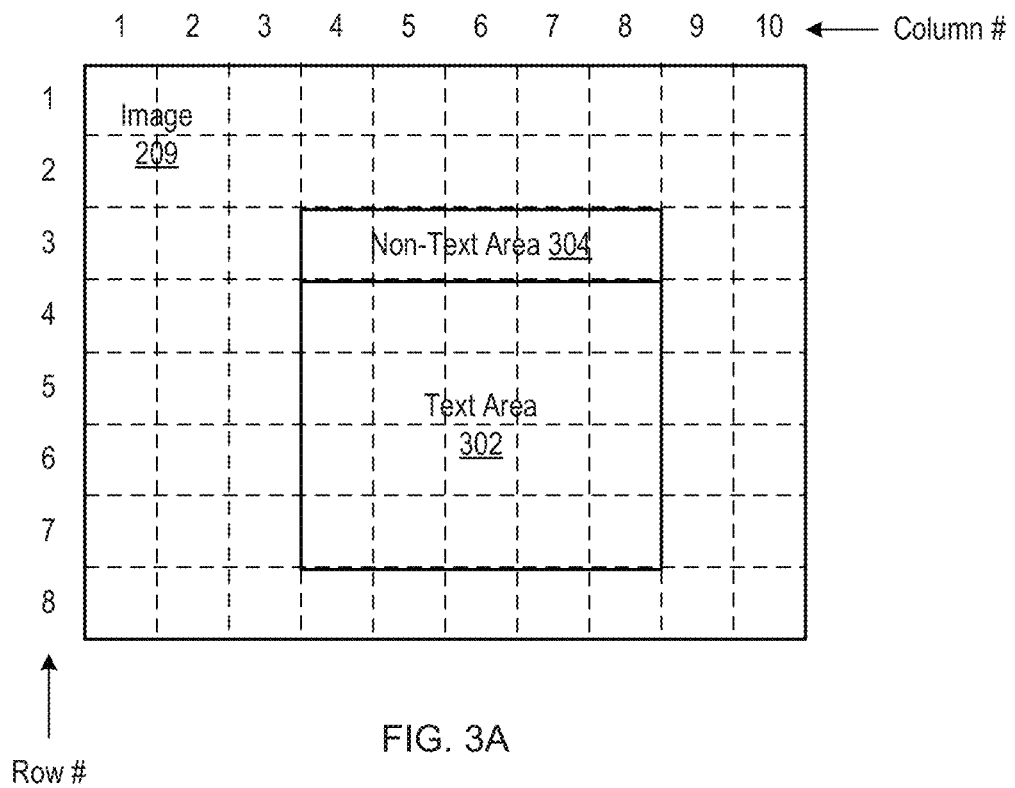
FIGS. 3A-3E each schematically illustrate the results of image analysis carried out according to various embodiments.

FIG. 3A schematically illustrates the results of image analysis carried out by image analyzer 222 according to one embodiment. This embodiment leverages the knowledge that many software applications display menus and other application-specific images directly above a text-input area. Accordingly, in this embodiment, image analyzer 222 first identifies a text area in image 209 (e.g., text area 302 which include (4,4)-(4,8), (5,4)-(5,8), (6,4)-(6,8), (7,4)-(7,8)), presupposes that the area directly above the text area (e.g., non-text area 304 which include (3,4)-(3,8)) is a menu area, and then selects a lossless compression protocol for both of these two areas. Image analyzer 222 selects a lossy compression protocol for other areas of image 209. With this embodiment, menus and other items generally appearing above the text area will be reproducible at client device 108 with the same clarity as the text area, even in low-bandwidth environments when non-text areas may be subjected to lossy compression.

Figure 3B:
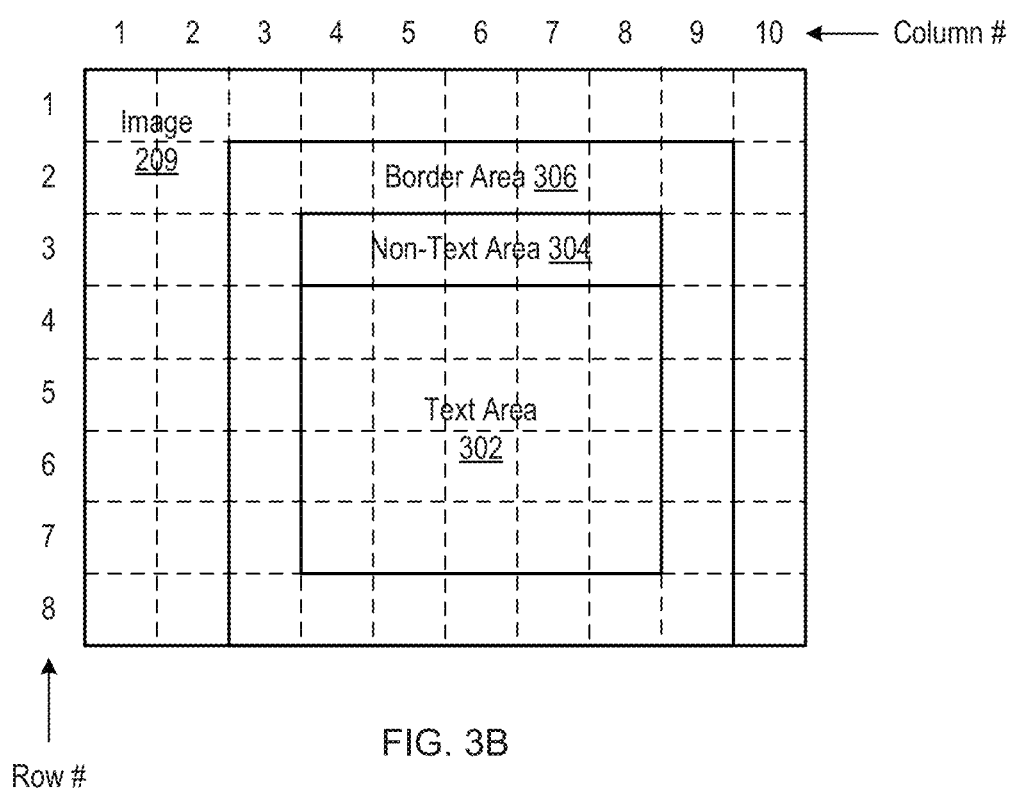

FIG. 3B schematically illustrates the results of image analysis carried out by image analyzer 222 according to another embodiment. This embodiment leverages the knowledge that many software applications display text-input area and menu area within a window. Accordingly, in this embodiment, image analyzer 222 first identifies a text area in image 209 (e.g., text area 302 which include (4,4)-(4,8), (5,4)-(5,8), (6,4)-(6,8), (7,4)-(7,8)), presupposes that the area that is directly above the text area (e.g., non-text area 304 which include (3,4)-(3,8)) is a menu area and that the area surrounding the text area and the menu area is a border area (e.g., border area 306 which include (2,3)-(2,9), (3,3), (3,9), (4,3), (4,9), (5,3), (5,9), (6,3), (6,9), (7,3), (7,9), (8,3)-(8,9)), and then selects a lossless compression protocol for these three areas. Image analyzer 222 selects a lossy compression protocol for the other areas of image 209. With this embodiment, any text or menu item appearing near the window edge (which may have been determined as a non-text area according to conventional techniques because the area did not contain a threshold amount of text) will be reproducible at client device 108 with the same clarity as the text area, even in low-bandwidth environments when non-text areas may be subjected to lossy compression. In addition, this embodiment ensures the window edge to be reproduced with improved clarity in situations where a window edge overlays a complex background. Using standard techniques, the window edge may be encoded using a lossy compression protocol, blurring the window edges when displayed at the client device, or alternating between lossy and lossless compression to cause the window edge to disconcertingly blur at certain points along the window edge when displayed at the client device.

Figure 3C:
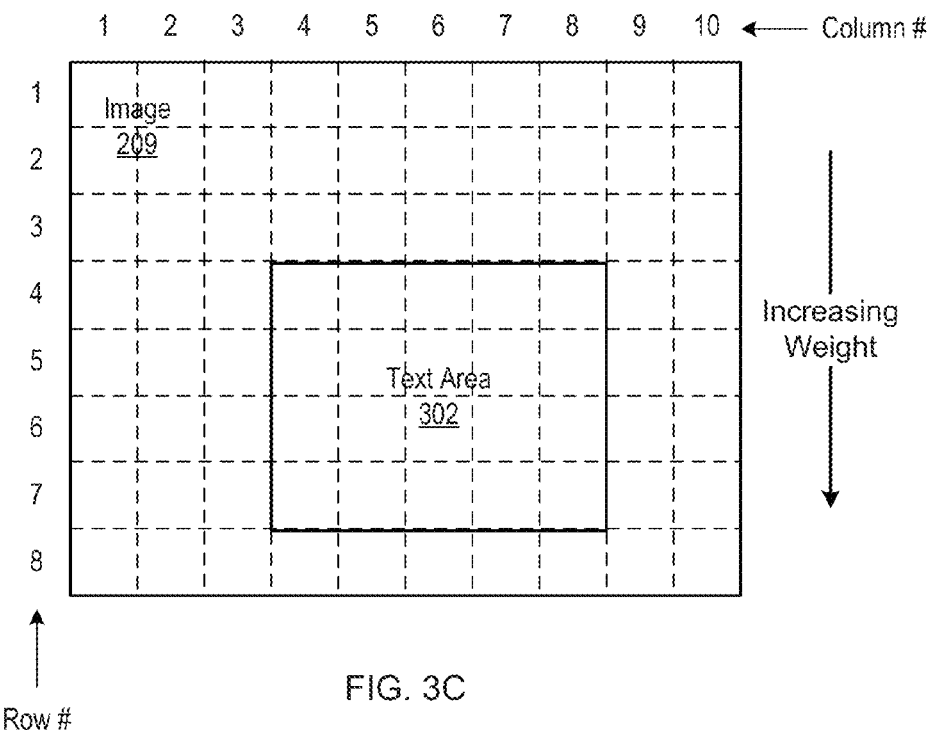

FIG. 3C schematically illustrates the results of image analysis carried out by image analyzer 222 according to another embodiment. This embodiment leverages the knowledge that maintaining image fidelity is more important for upper portions of desktop images than for lower portions of desktop images. Accordingly, in this embodiment, image analyzer 222 first identifies a text area in image 209 (e.g., text area 302 which include (4,4)-(4,8), (5,4)-(5,8), (6,4)-(6,8), (7,4)-(7,8)), and selects a lossless compression protocol for the text area. For all other areas of image 209, image analyzer 222 selects a lossless or lossy compression protocol based on a weighting factor given to image regions in the area according to their respective location within image 209 (higher the location, higher the weighting factor) and the available bandwidth. For example, in very low-bandwidth environments, lossless compression may not be selected for any of the other areas of image 209. As the bandwidth situation improves, image regions of the other areas of image 209 that are located higher in image 209 begin to be selected for lossless compression.

Figure 3D:
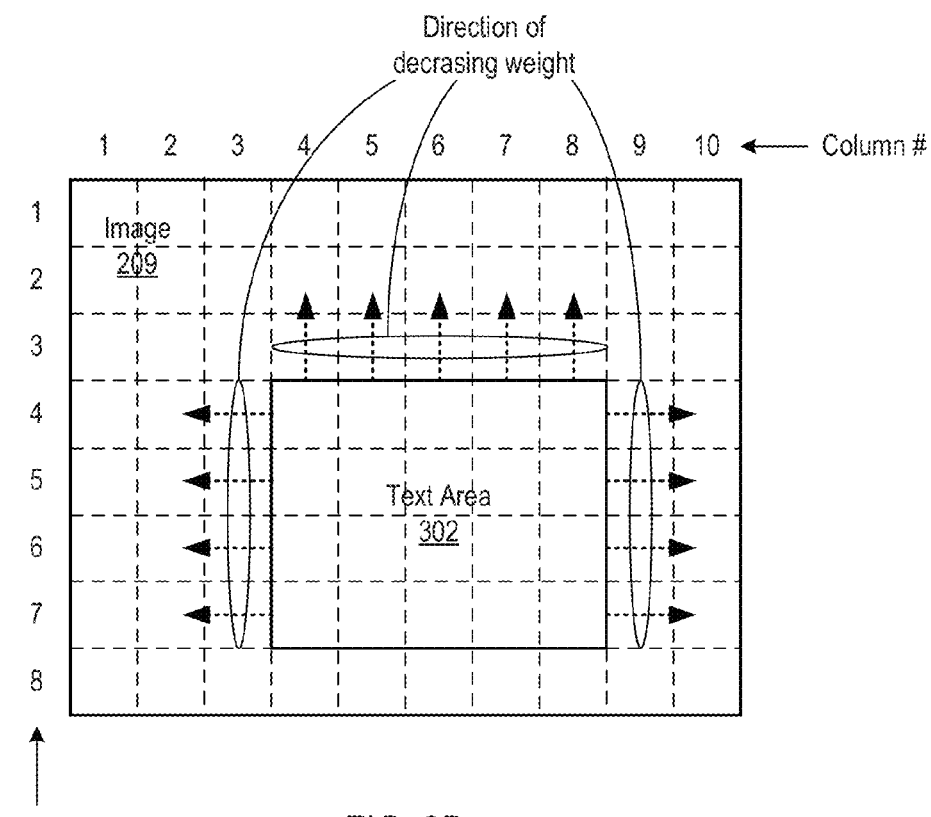

FIG. 3D schematically illustrates the results of image analysis carried out by image analyzer 222 according to another embodiment. This embodiment leverages the knowledge that maintaining image fidelity is more important for regions of image 209 that are closer to the text area than for regions of image 209 that are farther away. Accordingly, in this embodiment, image analyzer 222 first identifies a text area in image 209 (e.g., text area 302 which include (4,4)-(4,8), (5,4)-(5,8), (6,4)-(6,8), (7,4)-(7,8)), and selects a lossless compression protocol for the text area. For all other areas of image 209, image analyzer 222 selects a lossless or lossy compression protocol based on a weighting factor given to image regions in the area according to their respective proximity to the text area (closer to the text area, higher the weighting factor) and the available bandwidth. For example, in very low-bandwidth environments, lossless compression may not be selected for any of the other areas of image 209. As the bandwidth situation improves, image regions of the other areas of image 209 that are located closer to the text area begin to be selected for lossless compression.

Figure 3E:
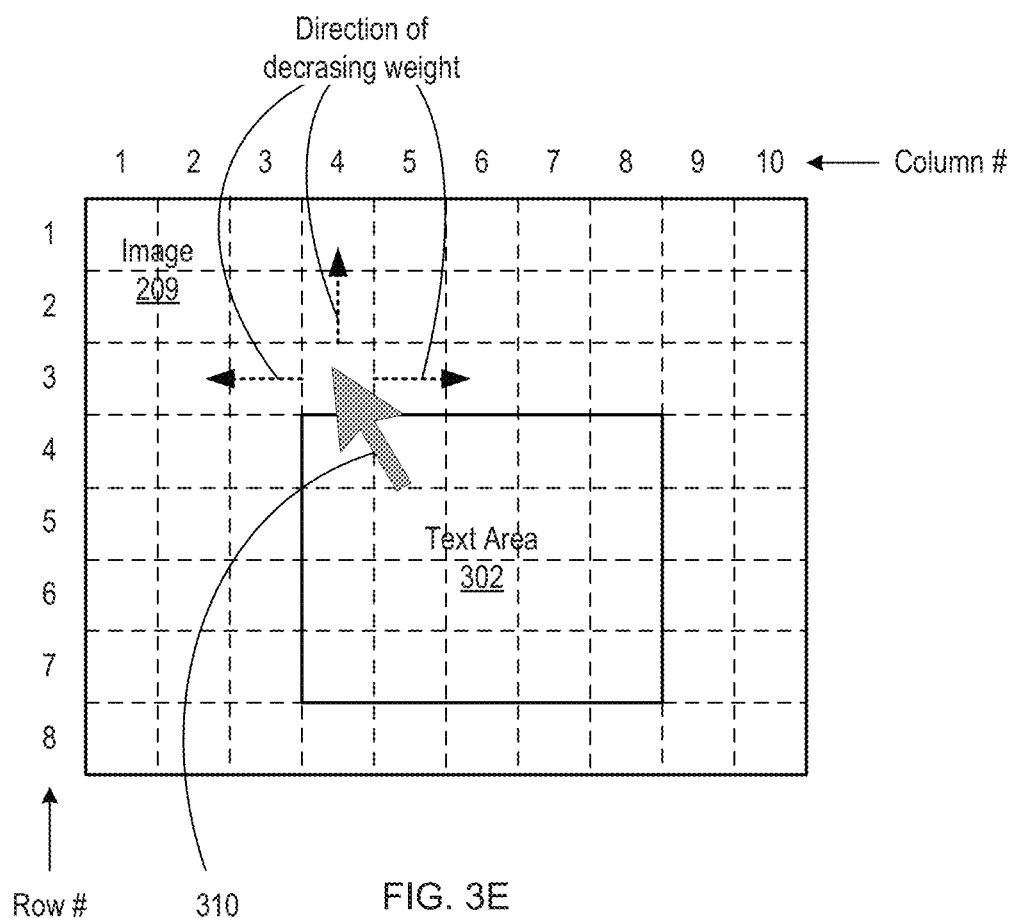

FIG. 3E schematically illustrates the results of image analysis carried out by image analyzer 222 according to another embodiment. This embodiment leverages the knowledge that maintaining image fidelity is more important for regions of image 209 that are closer to a current location of mouse cursor 310 than for regions of image 209 that are farther away. Accordingly, in this embodiment, image analyzer 222 first identifies a text area in image 209 (e.g., text area 302 which include (4,4)-(4,8), (5,4)-(5,8), (6,4)-(6,8), (7,4)-(7,8)), and selects a lossless compression protocol for the text area. For all other areas of image 209, image analyzer 222 selects a lossless or lossy compression protocol based on a weighting factor given to image regions in the area according to their respective proximity to the current cursor location (closer to the cursor location, higher the weighting factor) and the available bandwidth. For example, in very low-bandwidth environments, lossless compression may not be selected for any of the other areas of image 209. As the bandwidth situation improves, image regions of the other areas of image 209 that are located closer to the cursor location begin to be selected for lossless compression.

FIGS. 3A-3E provide five examples of how image analyzer 222 can be implemented. In other examples, one or more techniques disclosed in these examples may be combined. In addition, image analyzer 222 may select for lossless compression the non-text area that is (1) directly below, directly to the right, or directly to the left of the text area, (2) spaced apart from the text area by a predetermined distance, or (3) more generally, located within an "area of influence" around the text area (where the size of the "area of influence" may be proportional to size of the text area). In some embodiment, the size of the "area of influence" is set to be inversely proportional to bandwidth constraints. For example, the size of the "area of influence" may be set larger as bandwidth constraints become smaller. In other embodiments, the size of the "area of influence" is set to be directly or indirectly proportional to lossiness of the compression algorithms that would otherwise be used therein.

In some embodiments, image analyzer 222 may not always select lossless compression for the "area of influence." The amount of local text areas can be used as a weighting factor in the selection process, so that lossless compression would be more likely be selected for "text-like" areas. Additionally, the degree of weighting may be influenced by available bandwidth and distance from the text area. For example, the higher the available bandwidth and closer to the text area, the more likely lossless compression would be selected for the area.

In the embodiments described above, available bandwidth is a consideration in determining whether or not to select lossless compression for non-text regions of image 209. In some embodiments, when the available bandwidth decreases below a threshold level, image analyzer 222 selects compression protocols in the conventional manner. As the available bandwidth increases to above the threshold level, image analyzer 222 selects compression protocols according to the embodiments described herein but may limit the number of non-text regions of image 209 that are selected for lossless compression protocol in accordance with the available bandwidth.

In the embodiments described above, non-text regions of image 209 that would otherwise be subjected to lossy compression protocols using conventional techniques are subjected to an upgrade in compression protocols (e.g., to lossless compression protocols). In alternative embodiments, the upgraded compression protocol is not a lossless compression protocol but is a higher fidelity (less lossy) compression protocol relative to the lossy compression protocol that would otherwise be applied. In addition, because the embodiments identify upgrade possibilities and do not downgrade any of the compression protocols that would otherwise be applied using conventional techniques, it should be recognized that the proposed technique implements a "best efforts" approach and does not need to be correct 100% of the time.

In addition, the embodiments described herein can enhance conventional remoting protocols that employ the so-called "image refinement" in low-bandwidth scenarios. This feature allows the remoting protocols to initially and rapidly provide a low-quality image to the client device and then gradually refine the image (i.e., improve image quality) if the image remains static. The embodiments described herein can provide information about which image areas it make sense to prioritize in the subsequent progressive build process. This prioritization information would be harvested from the analysis provided by image analyzer 222, e.g., non-text regions that have been selected for lossless compression become candidates for accelerated refinement.

FIG. 4 is a flow diagram of method steps for generating compressed desktop image for a client device, according to one embodiment. In the embodiment described herein, these method steps are being carried out by a remote desktop application (e.g., remote desktop 206) running in a VM that is instantiated in a host computer. At step 402, the remote desktop application generates image data 208 used to produce an image of the remote desktop. It should be recognized that step 402 and the steps that follow are continually executed as the remote desktop image is updated in response to user inputs received from the client device. At step 404, an image analyzer of the remote desktop application (e.g., image analyzer 222) is invoked to analyze the remote desktop image and identify text regions. Any of the well-known techniques for determining whether a region of an image is a text region or not may be employed here. Then, at step 406, the image analyzer evaluates the spatial relationship between non-text regions with respect to the text regions to determine whether lossless compression (or in some embodiments, higher fidelity "less lossy" compression relative to lossy compression that would normally be applied to non-text regions) should be applied to them. For example, in the embodiments described above in conjunction with FIGS. 3A and 3B, non-text area 304 that is directly above text area 302 would be selected for lossless (or less lossy) compression. In the example of FIG. 3B, border area 306 would also be selected for lossless (or less lossy) compression. At step 408, a compression module of the remote desktop application performs compression of the image data 208, using lossless (or less lossy) compression for the portion of image data 208 corresponding to the text regions and the non-text regions selected for lossless (or less lossy) compression at step 406 and lossy compression for the portion of image data 208 corresponding to the other non-text regions. Then, at step 410, the compressed image data is transmitted to the client device.

FIG. 5 is a flow diagram of method steps for generating compressed desktop image for a client device, according to another embodiment. In the embodiment described herein, these method steps are being carried out by a remote desktop application (e.g., remote desktop 206) running in a VM that is instantiated in a host computer. At step 502, the remote desktop application generates image data 208 used to produce an image of the remote desktop. It should be recognized that step 502 and the steps that follow are continually executed as the remote desktop image is updated in response to user inputs received from the client device. At step 504, an image analyzer of the remote desktop application (e.g., image analyzer 222) is invoked to analyze the remote desktop image and identify text regions. Any of the well-known techniques for determining whether a region of an image is a text region or not may be employed here. Then, at step 506, the image analyzer determines weighting factors for applying lossless compression (or in some embodiments, higher fidelity "less lossy" compression relative to lossy compression that would normally be applied to non-text regions) to non-text regions based on a spatial relationship of the non-text regions with respect to a certain feature in the remote desktop image, e.g., top of the remote desktop image as described in conjunction with FIG. 3C, text area 302 as described in conjunction with FIG. 3D, or current location of mouse cursor 310 as described in conjunction with FIG. 3E. Then, at step 508, compression protocols are selected for non-text regions based on their weighting factors and the available bandwidth. As described above, when the available bandwidth is very low, e.g., below a predetermined threshold level, none of the non-text regions are selected for lossless (or less lossy) compression. As the available bandwidth increases to above the predetermined threshold level, increasing number of non-text regions are selected for lossless (or less lossy) compression based on their weighting factors. At step 510, a compression module of the remote desktop application performs compression of the image data 208, using lossless (or less lossy) compression for the portion of image data 208 corresponding to the text regions and the non-text regions selected for lossless (or less lossy) compression at step 508 and lossy compression for the portion of image data 208 corresponding to the other non-text regions. Then, at step 512, the compressed image data is transmitted to the client device.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of generating compressed data representing a remote desktop image, for a client device, comprising:
    generating image data for a remote desktop image and analyzing different regions of the remote desktop image;
    identifying those regions of the remote desktop image that are text regions;
    selecting non-text regions of the remote desktop image based on a predefined spatial relationship between the non-text regions and the text regions, wherein the predefined spatial relationship indicates locations of non-text regions around text regions whose image data are to be compressed using a first compression protocol which is an upgrade from and is less lossy than a second compression protocol, and wherein no non-text regions are selected for compression using downgraded compression protocols more lossy than the second compression protocol and no text regions are selected for compression using downgraded compression protocols more lossy than the first compression protocol;
    compressing the image data using the first compression protocol for a first portion of the image data corresponding to the text regions and the selected non-text regions and compressing the image data using the second compression protocol for a second portion of the image data not corresponding to the text regions or the selected non-text regions; and
    transmitting the compressed image data to the client device.

2. The method of claim 1, wherein the predefined spatial relationship comprises a spatial orientation of the non-text regions with respect to the text regions.

3. The method of claim 2, wherein those non-text regions that are located directly above the text regions are selected.

4. The method of claim 1, wherein those non-text regions that surround the text regions are selected.

5. The method of claim 1, wherein a size of the non-text regions that are selected is based on an available bandwidth for transmitting the compressed image data to the client device.

6. The method of claim 1, wherein a size of the non-text regions that are selected is based on a total size of the text regions.

7. A method of generating compressed data representing a remote desktop image, for a client device, comprising:
    generating image data for a remote desktop image and analyzing different regions of the remote desktop image;
    identifying those regions of the remote desktop image that are text regions;
    determining weighting factors for non-text regions of the remote desktop image based on a proximity to a feature in the remote desktop image, the proximity being a predefined spatial relationship used to identify non-text regions around the feature whose image data are to be compressed using a first compression protocol which is an upgrade from and is less lossy than a second compression protocol, and wherein no non-text regions are selected for compression using downgraded compression protocols more lossy than the second compression protocol and no text regions are selected for compression using downgraded compression protocols more lossy than the first compression protocol;
    selecting non-text regions of the remote desktop image based on the weighting factors;
    compressing the image data using the first compression protocol for a portion of the image data corresponding to the text regions and the selected non-text regions and compressing the image data using the second compression protocol for a second portion of the image data not corresponding to the text regions or the selected non-text regions; and
    transmitting the compressed image data to the client device.

8. The method of claim 7, wherein non-text regions that are closer to the feature are given higher weighting factors than non-text regions that are farther away, and non-text regions with higher weighting factors are selected prior to non-text regions with lower weighting factors.

9. The method of claim 8, wherein the feature is a top of the remote desktop image.

10. The method of claim 8, wherein the feature is a region encompassed by the text regions.

11. The method of claim 8, wherein the feature is a current location of a mouse cursor.

12. The method of claim 7, wherein said selecting of the non-text regions of the remote desktop image is further based on an available bandwidth for transmitting the compressed image data to the client device.

13. The method of claim 12, wherein the number of non-text regions selected increases as the available bandwidth increases.

14. A non-transitory computer-readable storage medium comprising instructions for causing a computer system to carry out a method of generating compressed data representing a remote desktop image for a client device, said method comprising the steps of:
    generating image data for a remote desktop image and analyzing different regions of the remote desktop image;
    identifying those regions of the remote desktop image that are text regions;
    selecting non-text regions of the remote desktop image based on a predefined spatial relationship between the non-text regions and a feature in the remote desktop image, wherein the predefined spatial relationship indicates locations of non-text regions around the feature whose image data are to be compressed using a first compression protocol which is an upgrade from and is less lossy than a second compression protocol, and wherein no non-text regions are selected for compression using downgraded compression protocols more lossy than the second compression protocol and no text regions are selected for compression using downgraded compression protocols more lossy than the first compression protocol;
    compressing the image data using the first compression protocol for a first portion of the image data corresponding to the text regions and the selected non-text regions and compressing the image data using the second compression protocol for a second portion of the image data not corresponding to the text regions or the selected non-text regions; and transmitting the compressed image data to the client device.

15. The non-transitory computer-readable storage medium of claim 14, wherein non-text regions that are closer to the feature are selected prior to non-text regions that are farther away.

16. The non-transitory computer-readable storage medium of claim 15, wherein the feature is a top of the remote desktop image.

17. The non-transitory computer-readable storage medium of claim 15, wherein the feature is a region encompassed by the text regions.

18. The non-transitory computer-readable storage medium of claim 15, wherein the feature is a current location of a mouse cursor.

19. The non-transitory computer-readable storage medium of claim 14, wherein said selecting of the non-text regions of the remote desktop image is further based on an available bandwidth for transmitting the compressed image data to the client device.

20. The non-transitory computer-readable storage medium of claim 19, wherein the number of non-text regions selected increases as the available bandwidth increases.

* * * * *